US011089024B2

(12) United States Patent
Patrich et al.

(10) Patent No.: US 11,089,024 B2
(45) Date of Patent: Aug. 10, 2021

(54) SYSTEM AND METHOD FOR RESTRICTING ACCESS TO WEB RESOURCES

(71) Applicant: Microsoft Technology Licensing, LLC, Redmond, WA (US)

(72) Inventors: Dotan Patrich, Rishon LeZion (IL); Ram Haim Pliskin, Rishon LeZion (IL); Tomer Koren, Tel Aviv (IL); Moshe Israel, Ramat-Gan (IL); Hani Hana Neuvirth, Redmond, WA (US); Josef Weizman, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 143 days.

(21) Appl. No.: 15/917,315

(22) Filed: Mar. 9, 2018

(65) Prior Publication Data
US 2019/0281064 A1 Sep. 12, 2019

(51) Int. Cl.
*H04L 29/06* (2006.01)
*G06F 16/955* (2019.01)

(52) U.S. Cl.
CPC .......... *H04L 63/102* (2013.01); *G06F 16/955* (2019.01); *H04L 63/10* (2013.01);
(Continued)

(58) Field of Classification Search
CPC ..... H04L 63/102; H04L 63/10; H04L 63/101; H04L 63/1408; H04L 63/1425;
(Continued)

(56) References Cited

U.S. PATENT DOCUMENTS 6,438,539 B1\* 8/2002 Korolev ................ G06F 16/951
7,831,581 B1\* 11/2010 Emigh .................. G06F 16/986
707/706
(Continued)

FOREIGN PATENT DOCUMENTS

CN 105262720 A 1/2016

OTHER PUBLICATIONS

Doran "Detection, Classification and Workload Analysis of Web Robots," Apr. 18, 2014, pp. 1-215 (Year: 2014).\*
(Continued)

*Primary Examiner* — Luu T Pham
*Assistant Examiner* — James J Wilcox
(74) *Attorney, Agent, or Firm* — Fiala & Weaver P.L.L.C.

(57) ABSTRACT

Systems, methods, and apparatuses are provided for restricting access to a web resource. Website access information is obtained by monitoring accesses to a plurality of websites for each access, which may include a network identifier of an access requestor, a website identifier, and an access time for each request. Based on at least the website access information, it may be determined that a particular access requestor has accessed a number of different websites in a given time period. As a result, the particular access requestor may be classified as a web robot. A request to permit access to a web resource is received by the particular access requestor. In response to receiving the request to permit access to the web resource, the particular access requestor is prevented from accessing the web resource and/or a notification is generated that the particular access requestor is attempting to access the web resource.

20 Claims, 7 Drawing Sheets

(52) U.S. Cl.
CPC ........ *H04L 63/101* (2013.01); *H04L 63/1408*
(2013.01); *H04L 63/1425* (2013.01); *H04L*
*63/1441* (2013.01); *H04L 2463/144* (2013.01);
*H04L 2463/146* (2013.01)

(58) Field of Classification Search
CPC ........... H04L 63/1441; H04L 2463/144; H04L
2463/146; G06F 16/955
See application file for complete search history.

(56) References Cited

U.S. PATENT DOCUMENTS

| | | | | |
|---|---|---|---|---|
| 7,987,173 | B2* | 7/2011 | Alexander | G06F 16/9566 |
| | | | | 707/709 |
| 8,800,043 | B2* | 8/2014 | Khachaturov | G06F 21/577 |
| | | | | 726/25 |
| 8,862,580 | B1* | 10/2014 | Emigh | G06F 16/986 |
| | | | | 707/731 |
| 8,938,500 | B1* | 1/2015 | Acharya | G06Q 50/01 |
| | | | | 709/204 |
| 9,043,928 | B1* | 5/2015 | Paczkowski | H04L 63/10 |
| | | | | 713/1 |
| 9,202,221 | B2* | 12/2015 | Wise | G06Q 30/02 |
| 9,262,593 | B2* | 2/2016 | Kay | G06Q 30/00 |
| 9,300,814 | B2* | 3/2016 | Thapar | H04L 41/0826 |
| 9,466,065 | B2* | 10/2016 | Hatakeda | G06Q 30/02 |
| 9,721,036 | B2* | 8/2017 | Shen | G06F 16/9577 |
| 10,095,788 | B2* | 10/2018 | Parsana | G06F 16/951 |
| 10,154,041 | B2* | 12/2018 | Kohli | H04L 63/101 |
| 10,326,789 | B1* | 6/2019 | Vines | H04L 67/02 |
| 10,394,796 | B1* | 8/2019 | Dang | G06F 16/2365 |
| 10,585,866 | B2* | 3/2020 | Grim, III | G06F 16/986 |
| 2002/0059221 | A1* | 5/2002 | Whitehead | G06F 16/9535 |
| 2002/0078044 | A1* | 6/2002 | Song | G06F 16/355 |
| 2003/0005287 | A1* | 1/2003 | Wray | G06F 21/31 |
| | | | | 713/155 |
| 2006/0031938 | A1* | 2/2006 | Choi | G06F 21/577 |
| | | | | 726/25 |
| 2007/0005652 | A1* | 1/2007 | Choi | G06F 16/955 |
| 2007/0198711 | A1* | 8/2007 | Maring | G06F 16/9577 |
| | | | | 709/225 |
| 2008/0015927 | A1* | 1/2008 | Ramirez | G06Q 10/06395 |
| | | | | 705/7.29 |
| 2008/0155694 | A1 | 6/2008 | Kwon et al. | |
| 2010/0306184 | A1* | 12/2010 | Wang | H04L 63/02 |
| | | | | 707/707 |
| 2012/0047153 | A1 | 2/2012 | Thomas | |
| 2013/0262268 | A1* | 10/2013 | Gromoll | G06Q 10/107 |
| | | | | 705/26.61 |
| 2014/0007183 | A1* | 1/2014 | Qureshi | H04L 63/0428 |
| | | | | 726/1 |
| 2014/0019488 | A1* | 1/2014 | Wo | G06F 21/6218 |
| | | | | 707/784 |
| 2014/0068773 | A1* | 3/2014 | Stitelman | H04L 63/10 |
| | | | | 726/24 |
| 2014/0351891 | A1* | 11/2014 | Grube | G06F 11/0727 |
| | | | | 726/3 |
| 2016/0112538 | A1* | 4/2016 | Wo | H04L 67/32 |
| | | | | 709/225 |
| 2016/0191522 | A1* | 6/2016 | Liang | H04L 9/32 |
| | | | | 713/168 |
| 2017/0103219 | A1 | 4/2017 | Siegel et al. | |
| 2017/0142090 | A1* | 5/2017 | Mahaffey | H04L 63/0869 |
| 2017/0243028 | A1 | 8/2017 | Lafever et al. | |
| 2018/0041590 | A1* | 2/2018 | Ma | G06F 17/2288 |
| 2018/0262587 | A1* | 9/2018 | Berkovitz | H04L 67/02 |
| 2019/0207975 | A1* | 7/2019 | Wardman | H04L 51/046 |

OTHER PUBLICATIONS

McKenna "Detection and Classification of Web Robots with Honeypots," Mar. 2016, pp. 1-64 (Year: 2016).*
"International Search Report and Written Opinion Issued in PCT Application No. PCT/US2019/020176", dated Apr. 15, 2019, 13 Pages.

* cited by examiner

500

502

Determine that a number of websites accessed by a particular access requestor during a time period exceeds a threshold

Determine that a particular access requestor has accessed one or more restricted web resources

Generate a measure of confidence that a particular access requestor is a web robot

FIG. 7

SYSTEM AND METHOD FOR RESTRICTING ACCESS TO WEB RESOURCES

BACKGROUND

Web robots, also known as bots, may cause automated tasks or scripts to be executed over the Internet at speeds much greater than those possible by a human. Web robots may be utilized for a number of legitimate purposes online. For example, in order for online search engines to provide accurate search results in response to a query, search engines typically employ web robots to scan and index websites across the Internet. While many website owners may be interested in having content from their websites indexed by search engines, there may be certain content or pages that website owners prefer not to be indexed. For example, website owners may prefer that account login pages, administrator pages, private pages, or other pages where sensitive information may be accessible are not indexed. To achieve this, website owners may place a publicly available file on their website identifying one or more resources that should be restricted from indexing. Web robots employed by search engines typically follow the restrictions provided in such a file, thereby preventing the resources from being indexed.

However, not all web robots are benign. Web robots are also widely utilized by malicious actors to scan websites for potential vulnerabilities. In many instances, web robots may first access the file identifying resources that should be restricted from being indexed in order to identify private and/or sensitive pages of a website, and focus attack efforts on such pages. Moreover, depending on the resources identified by a website owner in the publicly available file, malicious robots may be able to readily determine an overall organization, design and/or structure of a website (e.g., to locate administrator-only pages) to identify other potential website security weaknesses or take unauthorized control of a website.

Thus, while such a publicly available file may be beneficial to a website owner wishing to have parts of a website excluded from indexing, it may serve as a starting point for malicious robots to identify and potentially exploit vulnerabilities. With website owners constantly making a greater amount of private and/or sensitive information accessible via the Internet, preventing unauthorized access of such information becomes increasingly important.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, and computer program products are provided for restricting access to a web resource. Website access information is obtained by monitoring accesses to a plurality of websites for each access. The website access information may include, for instance, a network identifier of an access requestor, an identifier of a website being accessed, and an access time associated with the access. Based on at least the website access information, a particular access requestor may be classified as a web robot. For example, a particular access requestor that has accessed a threshold number of different websites in a given time period may be determined to be a web robot. A request to permit access to a web resource may be received by the particular access requestor classified as a web robot. In response to receiving the request to permit access to the web resource, the requestor is prevented from accessing the web resource and/or a notification is generated that the requestor is attempting to access the web resource.

In this manner, access to one or more web resources may be actively enforced by restricting access requestors classified as web robots from accessing web resources that are intended to be restricted or otherwise remain private. For example, where a website owner identifies one or more restricted resources in a file on the website, the file (and the resources identified therein) may be actively enforced such that web robots are restricted from such access, while other entities (e.g., human actors) are not. As a result, webpages containing access to private and/or sensitive information may be actively protected from web robots, thus minimizing the risk of potential attacks and enhancing a website's overall security.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the embodiments and to enable a person skilled in the pertinent art to make and use the example embodiments.

FIG. 5 shows a flowchart of a method for classifying an access requestor as a web robot based on a number of websites accessed, according to an example embodiment.

FIG. 6 shows a flowchart of a method for classifying an access requestor as a web robot by determining that the particular access requestor has accessed one or more restricted web resources, according to an example embodiment.

FIG. 7 shows a flowchart of a method for generating a measure of confidence and generating a notification and/or preventing access of a web resource based on the measure of confidence, according to an example embodiment.

Figure 1:
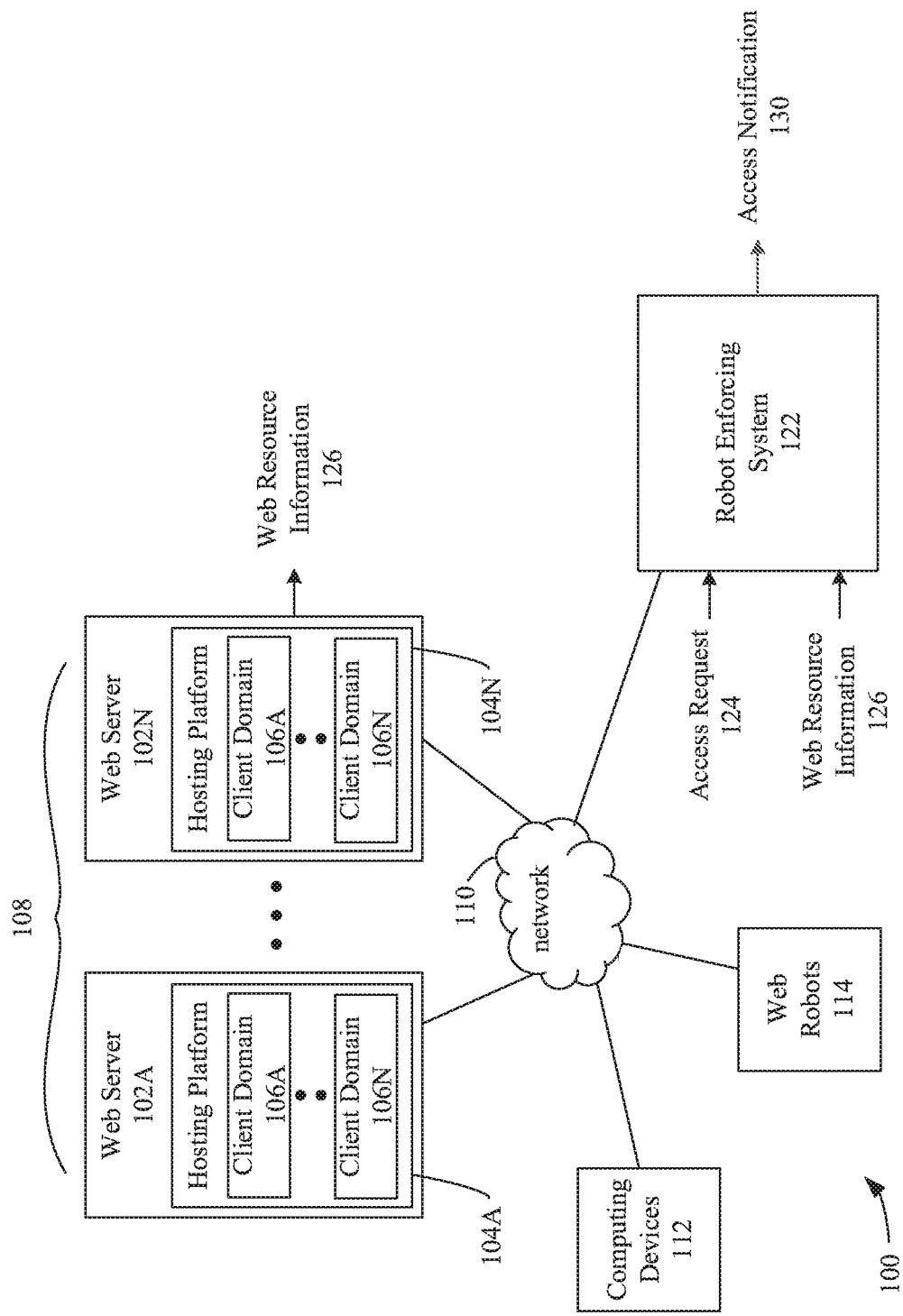
FIG. 1 shows a block diagram of a system for restricting access to a web resource, according to an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, are understood to mean that the condition or characteristic is defined to within tolerances that are acceptable for operation of the implementation for an application for which it is intended.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

As noted in the Background section above, web robots may cause automated tasks or scripts to be executed over the Internet at speeds much greater than those possible by a human. Web robots may be utilized for a number of legitimate purposes online. For example, in order for online search engines to provide accurate search results in response to a query, search engines typically employ web robots to scan and index websites across the Internet. While many website owners may be interested in having content from their websites indexed by search engines, there may be certain content or pages that website owners prefer not to be indexed. For example, website owners may prefer that account login pages, administrator pages, private pages, or other pages where sensitive information may be accessible are not indexed. To achieve this, website owners may place a publicly available file on their website identifying one or more resources that should be restricted from indexing. Web robots employed by search engines typically follow the restrictions provided in such a file, thereby preventing the resources from being indexed.

However, not all web robots are benign. Web robots are also widely utilized by malicious actors to scan websites for potential vulnerabilities. In many instances, web robots may first access the file identifying resources that should be restricted from being indexed in order to identify private and/or sensitive pages of a website, and focus attack efforts on such pages. Moreover, depending on the resources identified by a website owner in the publicly available file, malicious robots may be able to readily determine an overall organization, design and/or structure of a website (e.g., to locate administrator-only pages) to identify other potential website security weaknesses or take unauthorized control of a website.

For instance, a website owner may include a restriction not to index an administrator-only webpage (e.g., a login page to manage the website). While search engines can be expected to follow the restriction, malicious robots may identify the restriction as a primary target to attack or exploit vulnerabilities in the website. Thus, while such a publicly available file may be beneficial to a website owner wishing to have parts of a website excluded from indexing, it may serve as a starting point for malicious robots to identify and potentially exploit vulnerabilities. With website owners constantly making a greater amount of private and/or sensitive information accessible via the Internet, preventing unauthorized access of such information becomes increasingly important.

Implementations described herein address these issues by implementing a robot enforcing system comprising a website access tracker, a web robot detector, and a web resource enforcer. When a requestor visits a webpage, website access information may be obtained by the website access tracker. The website access information includes, for example, a network identifier (e.g., an Internet Protocol (IP) address) of a requestor, an identifier of the website being accessed, and an access time. Using the website access information, the web robot detector may classify one or more particular access requestors as web robots. For instance, if a particular access requestor has visited numerous websites during a given time period based on the obtained website access information, a determination may be made that the particular access requestor should be classified as a web robot. In an example, the web robot detector may leverage website access information obtained by a cloud services platform that can obtain access information associated with numerous independent websites, for instance, websites that are on different client domains. Because it is unlikely that a requestor would visit numerous unrelated websites in a given time period, the classification of web robots may thereby be performed with greater accuracy.

When a particular requestor visits a web resource, such as a restricted resource, the web resource enforcer may prevent the particular requestor from accessing the resource and/or generate a notification of the attempted access based on the particular requestor's classification as a web robot. In this way, access to web resources may be actively enforced by allowing access to requestors that are not classified as web robots, and restricting access to requestors that are classified as web robots.

This approach has numerous advantages, including but not limited to: enhancing a website's overall security by actively enforcing access restrictions to web resources that may contain or otherwise enable access to sensitive and/or private content. Furthermore, the classification of access requestors as web robots may be carried out automatically, thereby enabling the active enforcement of web resources with minimal user involvement. In addition, because the classification of access requestors may be based on website access information obtained by a cloud services platform that can observe accesses to a plurality of unrelated or independent domains, the web robot classification may be carried out accurately, decreasing the risk of restricting access to legitimate access requestors.

Accordingly, implementations can provide at least the following capabilities pertaining to active enforcement of web resources: (1) a mechanism to enhance the security of a website and prevent the exploitation of website vulnerabilities; (2) a mechanism for automatically classifying access requestors as web robots based on website access information; and (3) a mechanism for the accurate classification of access requestors as web robots.

Example implementations will now be described that are directed to techniques for actively enforcing access restrictions to a web resource. For instance, FIG. 1 shows a block diagram of an example system 100 for restricting access to a web resource, according to an example implementation. As shown in FIG. 1, system 100 includes a plurality of web servers 102A-102N, computing devices 112, web robots 114, and a robot enforcing system 122. Web servers 102A-102N define a network-accessible server infrastructure 108. Web servers 102A-102N, computing devices 112, web robots 114, and robot enforcing system 122 are communicatively coupled via one or more networks 110. Though robot enforcing system 122 is shown separate from web servers 102A-102N, in an example, robot enforcing system 122 may be included as node(s) in one or more of web servers 102A-102N or as virtual machines. Network 110 may comprise one or more networks such as local area networks (LANs), wide area networks (WANs), enterprise networks, the Internet, etc., and may include one or more of wired and/or wireless portions. In an implementation, computing devices 112, web robots 114, robot enforcing system 122, and each web server 102A-102N may communicate via one or more application programming interfaces (API). Each of these components will now be described in more detail.

Web servers 102A-102N may form a network-accessible server infrastructure, such as a cloud computing server network. For example, each of web servers 102A-102N may comprise a group or collection of servers (e.g., computing devices) that are each accessible by a network such as the Internet (e.g., in a "cloud-based" implementation) to store, manage, and process data. Each of web servers 102A-102N may comprise any number of computing devices, and may include any type and number of other resources, including resources that facilitate communications with and between the servers, storage by the servers, etc. (e.g., network switches, storage devices, networks, etc.). Web servers 102A-102N may be organized in any manner, including being grouped in server racks (e.g., 8-40 servers per rack, referred to as nodes or "blade servers"), server clusters (e.g., 2-64 servers, 4-8 racks, etc.), or datacenters (e.g., thousands of servers, hundreds of racks, dozens of clusters, etc.). In an implementation, web servers 102A-102N may be co-located (e.g., housed in one or more nearby buildings with associated components such as backup power supplies, redundant data communications, environmental controls, etc.) to form a datacenter, or may be arranged in other manners. Accordingly, in one implementation, web servers 102A-102N may each be a datacenter in a distributed collection of datacenters.

Note that the variable "N" is appended to various reference numerals for illustrated components to indicate that the number of such components is variable, with any value of 2 and greater. Note that for each distinct component/reference numeral, the variable "N" has a corresponding value, which may be different for the value of "N" for other components/reference numerals. The value of "N" for any particular component/reference numeral may be less than 10, in the 10 s, in the hundreds, in the thousands, or even greater, depending on the particular implementation.

In accordance with an implementation, each of web servers 102A-102N may be configured to service a particular geographical region. For example, web server 102A may be configured to service the northeastern region of the United States, and web server 102N may be configured to service the southwestern region of the United States. In another example, web server 102A may be configured to service the northwestern region of the United States, and web server 102N may be configured to service the southeastern region of the United States. It is noted that the network-accessible server set may include any number of web servers, and each web server may service any number of geographical regions worldwide.

Each of web servers 102A-102N may be configured to execute one or more services (including microservices), applications, and/or supporting services. A "supporting service" is a cloud computing service/application configured to manage a set of web servers (e.g., a cluster of web servers in web servers 102A) to operate as network-accessible (e.g., cloud-based) computing resources for users. Examples of supporting services include Microsoft® Azure®, Amazon Web Services™, Google Cloud Platform™, IBM® Smart Cloud, etc. A supporting service may be configured to build, deploy, and manage applications and services on the corresponding set of servers. Each instance of the supporting service may implement and/or manage a set of focused and distinct features or functions on the corresponding server set, including virtual machines, operating systems, application services, storage services, database services, messaging services, etc. Supporting services may be written in any programming language. Each of web servers 102A-102N may be configured to execute any number of supporting services, including multiple instances of the same supporting service.

In accordance with example embodiments, web servers 102A-102N may comprise one or more hosting platforms 104A-104N. Hosting platforms 104A-104N provide, among other things, web and/or data hosting services for one or more websites. For example, web servers 102A-102N may be configured to receive an access request to access a website hosted on hosting platforms 104A-104N, and provide access to the website in response to receiving the request. In an example, access requests may be received through an intermediary, such as robot enforcing system 122, as described below. Hosting platforms 104A-104N may also comprise a plurality of client domains 106A-106N. Client domains 106A-106N may include website content belonging to a plurality of clients or customers of a cloud services provider that provides and maintains web servers 102A-102N. In one example, client domains 106A-106N may comprise website content for a plurality of unrelated or independent domains. For instance, client domains 106A-106N may comprise website content for a plurality of companies lacking any meaningful business relationship with each other. In another example, hosting platforms 104A-104N may include a cloud service subscription, and client domains 106A-106N may comprise a plurality of subscriber accounts corresponding to the cloud service subscription. The examples provided herein are not, however, intended to be limiting. Client domains 106A-106N may comprise any other type of account (e.g., an account associated with an antivirus or firewall service), and web servers 102A-102N and/or hosting platforms 104A-104N may include a corresponding service.

As shown in FIG. 1, web servers 102A-102N may further comprise web resource information 126. Web resource information 126 may include, for one or more client domains 106A-106N, information regarding private and/or sensitive content hosted or accessible through client domains 106A-106N. For instance, one or more client domains 106A-106N may include a listing of one or more web resources that are not to be indexed by a search engine robot. Such restricted web resources may be identified within the listing by one or more URIs or other identifiers suitable for identifying individual webpages or collections of webpages, folders, website or file paths, images, documents, videos, databases, etc. that may be hosted on, or otherwise accessible through a particular client domain 106A-106N. In examples, restricted web resources may be identified using one or more "disallow" statements. In some instances, the listing may further identify one or more web resources that a website owner desires to be scanned by including an "allow" instruction for such resources. The listing may also identify one or more "disallow" or "allow" instructions, or the like, for a given access requestor by identifying a particular user agent, or may identify instructions applicable to all access requestors by including an asterisk corresponding to a user agent field.

The listing of one or more restricted web resources may be contained in any suitable format or data structure, including but not limited to, a text file, a database file, a spreadsheet, a document, etc. In some instances, the listing may be created manually (e.g., by a website developer, a systems or network administrator, a website administrator, etc.) or automatically (through an application used to create a website, or through a security, antivirus, and/or firewall service supporting a website). In a non-limiting example, the listing may be contained within a file placed in a root directory of a website. For instance, the listing may be provided as a robots.txt file placed in a root directory of a particular client domain 106A-106N. In accordance with techniques described herein, the listing may comprise any number of "disallow" and/or "allow" statements for all user agents (e.g., by inclusion of an asterisk) or for any particular user agent (e.g., by identifying the user agent). In an illustrative example, the listing may contain instructions as follows:

User-agent: *
Disallow: /admin/
Disallow: /accounts.html
Disallow: /image.jpg
Disallow: /spreadsheet.xls
User-agent: BingBot
Disallow: /private-directory/
Allow: /public-directory/home.html Computing devices 112 include the computing devices of users (e.g., individual users, family users, enterprise users, governmental users, etc.) that access web servers 102A-102N to obtain content from one or more websites through network 110. Computing devices 112 may include any number of computing devices, including tens, hundreds, thousands, millions, or even greater numbers of computing devices. Computing devices of computing devices 112 may each be may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer). Computing devices 112 may each interface with servers of web servers 102A-102N through application programming interfaces and/or by other mechanisms, such as a web browser (e.g., Microsoft® Internet Explorer, Google® Chrome, Apple® Safari, etc.) Note that any number of program interfaces or web browsers may be present.

Web robots 114 include computing devices, applications, and/or scripts that may attempt to access one or more websites of client domains 106A-106N via network 110. Web robots 114 may use automated techniques to carry out such accesses, and may access websites at speeds much higher than those possible by a human. In example embodiments, web robots 114 may include benign robots, such as online search engine robots designed for the purpose of indexing web pages, as well as malicious robots attempting to locate and exploit vulnerabilities on any of client domains 106A-106N, or access any other content on web servers 102A-102N for any unauthorized purpose. For instance, a malicious web robot may scan one or more websites to locate and access account login pages, administrator pages, private pages, or other pages where private or sensitive information may be accessible or hosted on client domains 106A-106N.

Web robots 114 may include any number of computing devices, applications and/or scripts that perform automated website access operations. Web robots 114 may be any type of stationary or mobile computing device, similar to computing device 112, or may be implemented thereon, to attempt to access content hosted on web servers 102A-102N. Web robots 114 may use such automated access techniques to scan a plurality of websites in a relatively short time period, e.g., in seconds, minutes or days. For instance, web robots 114 may be capable of using automated techniques to scan tens, hundreds, or even thousands of pages in a given time period.

Robot enforcing system 122 may be configured to actively enforce access restrictions to one or more web resources in accordance with techniques described herein. Although robot enforcing system 122 is shown separate from web servers 102A-102N, in an example, robot enforcing system 122 may be included as node(s) in one or more of web servers 102A-102N, as virtual machines, or otherwise implemented in any of web servers 102A-102N in any suitable manner Robot enforcing system 122 may also operate on one or more standalone computing devices connected to network 110 (e.g., as a single system or in a distributed system comprising a plurality of nodes) or otherwise be implemented as a service in the cloud. As discussed below, robot enforcing system 122 may receive an access request 124 corresponding to a request from any of computing devices 112 or web robots 114 to access content from one or more client domains 106A-106N. Based on one or more access requests, which may include website access information such as a network identifier of a requestor, an identifier of the website being accessed, and an access time, robot enforcing system 122 may classify a particular requestor as a web robot. For instance, where client domains 106A-106N are independent, belong to different subscriber accounts, or are otherwise unrelated, robot enforcing system 122 may classify a particular requestor as a web robot based on the particular requestor's accesses of content on client domains 106A-106N during a given time period exceeding a threshold. Because it is unlikely that an access requestor would visit numerous unrelated websites in a given time period, the classification of web robots may thereby be performed with a high degree of accuracy.

If an access request is received by the particular requestor to access a web resource on any of client domains 106A-106N once the particular requestor is classified as a web robot, robot enforcing system 122 may perform one or more actions in response to receiving the attempted access, such as preventing the requestor from accessing the web resource or generating an access notification 130. In some instances, robot enforcing system 122 may further identify whether a requested web resource is a restricted web resource (e.g., if it is identified in web resource information 126 as a restricted web resource), and allow or prevent access (or generate access notification 130) based on such information.

In an example, robot enforcing system 122 may be configured to act as an intermediary between access requestors (e.g., computing devices 112 or web robots 114) and content hosted on servers 102A-102N. In this way, robot enforcing system 122 may determine, based on access request 124, web resource information 126, and a classification of web robots, whether to permit or deny access to content hosted on web servers 102A-102N.

In another example where robot enforcing system 122 may not act as an intermediary, robot enforcing system 122 may receive one or more access requests 124 in the form of an access log or the like from one of web servers 102A-102N comprising website access information for each access in real-time or over a given time period after web servers 102A-102N receive an access request from a requestor. Robot enforcing system 122 may utilize the website access information in a similar manner to classify particular requestors as web robots. In an event that one of web servers 102A-102N receive an access request to access a web resource from a requestor classified as a web robot, one of web servers 102A-102N may transmit such an access request (in real-time, near real-time, or in the form of an access log) to robot enforcing system 122. Robot enforcing system 122 may determine that the particular requestor classified as a web robot has accessed a web resource and generate access notification 130 corresponding to the particular access requestor's access of the web resource.

Figure 2:
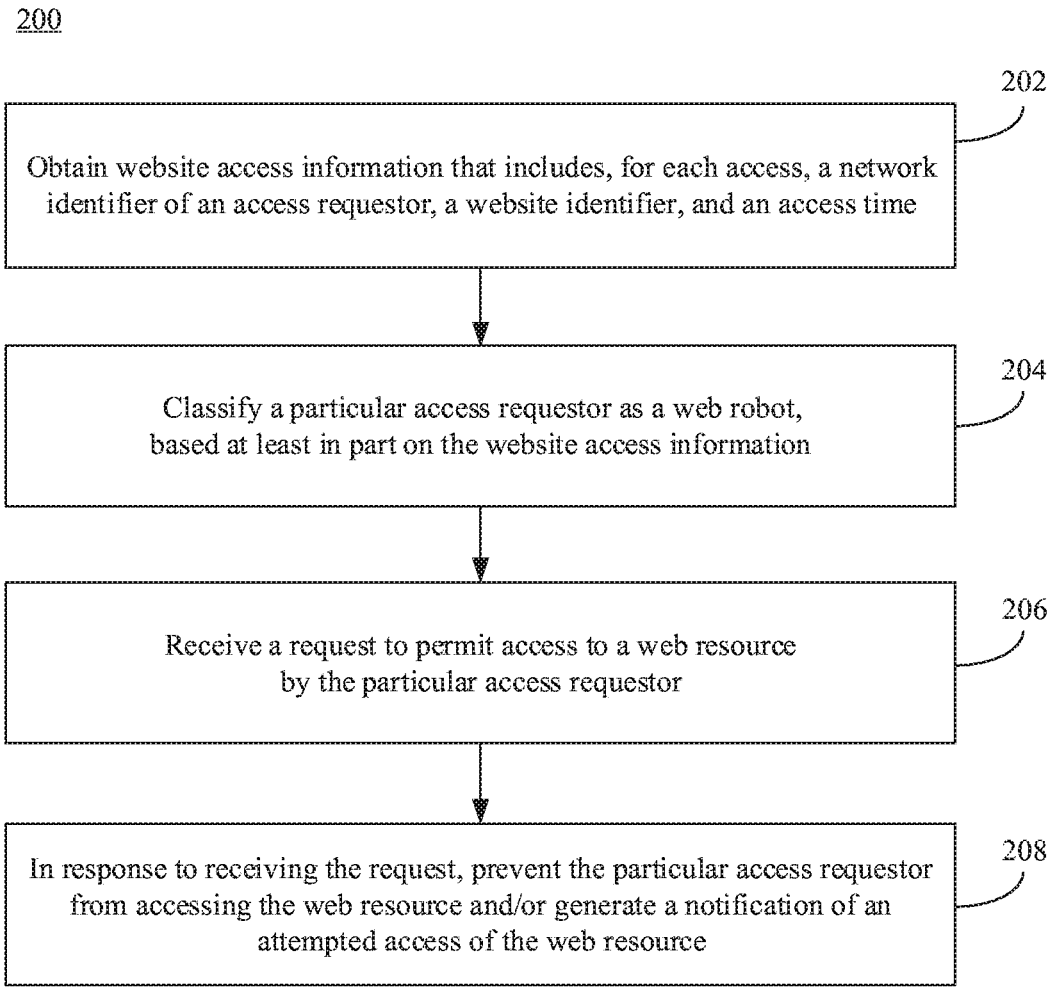
FIG. 2 shows a flowchart of a method for restricting access to a web resource, according to an example embodiment.

Accordingly, in implementations, access restrictions of a web resource of one or more client domains 106A-106N may be achieved. Robot enforcing system 122 may enable the access restrictions in various ways. For example, FIG. 2 shows a flowchart 200 of a method for restricting access to a web resource, according to an example embodiment. In an implementation, the method of flowchart 200 may be implemented by robot enforcing system 122. FIG. 2 is described with continued reference to FIG. 1. Other structural and operational implementations will be apparent to persons skilled in the relevant art(s) based on the following discussion regarding flowchart 200 and system 100 of FIG. 1.

Figure 3:
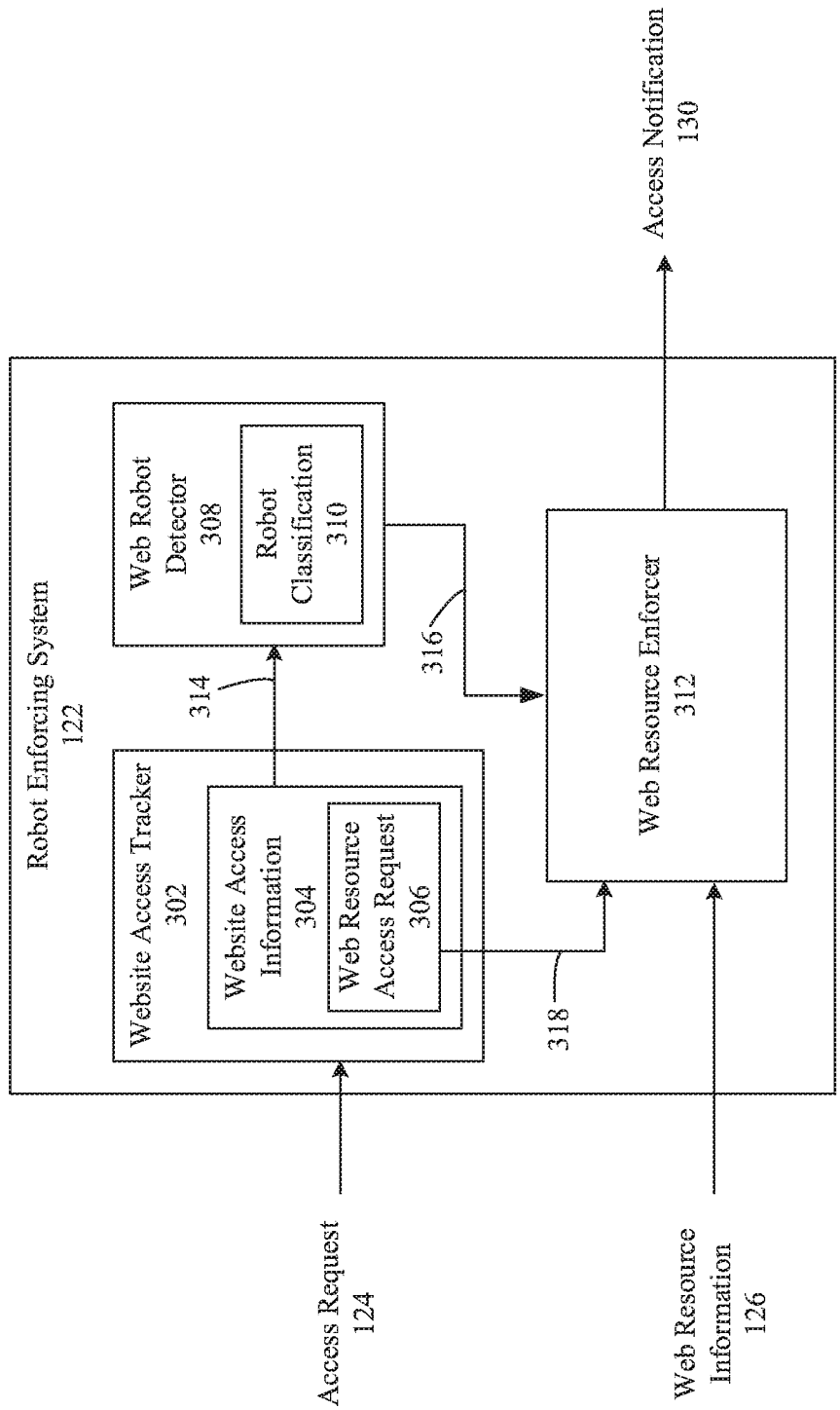
FIG. 3 shows a block diagram of a robot enforcing system, according to an example embodiment.

Flowchart 200 begins with step 202. In step 202, website access information is obtained by monitoring accesses to a plurality of websites, the website access information including, for each access, a network identifier of an access requestor, an identifier of a website accessed, and an access time associated with the access. For example, with reference with FIG. 1, an access requestor, such as computing devices 112 or web robots 114, may request access to content of any of client domains 106A-106N via network 110. Step 202 may also be performed in accordance with other implementations. For instance, FIG. 3 shows a block diagram of robot enforcing system 122, according to an example embodiment. As shown in FIG. 3, robot enforcing system 122 includes a website access tracker 302, a web robot detector 308, and a web resource enforcer 312. Website access tracker 302 stores website access information 304 obtained from access request 124. Website access information 304 may further comprise a web resource access request 306 that includes an access requestor's request to access one or more web resources (e.g., a restricted web resource). As shown in FIG. 3, web robot detector 308 stores a robot classification 310 that comprises a classification of one or more access requestors as web robots.

In accordance with step 202, website access tracker 302 may monitor accesses to a plurality of websites, such as any of the websites of client domains 106A-106N. Each access may comprise access request 124 that may be transmitted to web servers 102A-102N through a cloud-based security service or a web firewall service serving as an intermediary. In an example, access request 124 may be transmitted from computing devices 112 or web robots 114 through network 110 to website access tracker 302, as shown in FIGS. 1 and 3. In this manner, website access tracker 302 may receive access request 124 in real-time as the access requests are generated by the requestor.

In another example, computing devices 112 or web robots 114 may transmit access request 124 to web servers 102A-102N, e.g., without a security or web firewall intermediary. In such an example, web servers 102A-102N may provide the requested content to the access requestor in response to receiving access request 124, while also transmitting the received access request 124 (or a compilation of access requests) to website access tracker 302. Web servers 102A-102N may provide access request 124 (or a compilation of access requests) to website access tracker 302 in any suitable manner, such as in an access log form (e.g., containing a plurality of compiled access requests) periodically or aperiodically. For example, access request 124 (or a compilation of access requests) may be provided after a predetermined number of minutes, hours, or days. Web servers 102A-102N may also provide access request 124 to website access tracker 302 in real-time or near real-time, e.g., as web servers 102A-102N receive such requests from an access requestor.

From access request 124, website access tracker 302 may derive or obtain website access information 304 corresponding to information associated with the access request. For example, website access information 304 may include, for each access, a network identifier of an access requestor, an identifier of a website accessed, and an access time associated with the access. The network identifier may include any physical or non-physical address associated with the access requestor, such as an IP address, a Media Access Control (MAC) address, an identifier corresponding to a user agent of the access requestor, or any other address.

The identifier of the website accessed may comprise an identification of one or more websites hosted on web servers 102A-102N (e.g., one or more of client domains 106A-106N). In one example, the website identifier may include a website domain name. In another example, the website identifier may also identify one or more specific web resources accessed (e.g., a particular webpage, folder, or file within a client domain,). In another implementation, the identifier of the website may also comprise an IP addressed associated with the client domain being accessed.

In example embodiments, website access information 304 may further comprise a subscription identifier associated with the client domain being accessed. For instance, where one or more of client domains 106A-106N are subscribers of a cloud-based service, such as a website hosting service, an anti-virus service, a security service, a web firewall service, etc., website access information 304 may include a subscription identifier associated with the subscription service. While the subscription identifier may be provided as the identifier of the website accessed, the subscription identifier may also be provided as a separate identifier in addition to the website identifier as discussed above. In examples, because client domains 106A-106N may include to a plurality of different, unrelated, and/or independent domains, website access tracker 302 may be configured to obtain access requests corresponding to a plurality of different, unrelated, and/or independent websites. As a result, website access information 304 obtained by website access tracker may include identifiers (e.g., domains, IP addresses, and/or cloud service subscription account identifiers) associated with a plurality of unrelated websites.

Website access tracker 302 may be implemented in any number of physical machines, virtual machines, nodes, or cloud servers. For instance, website access tracker 302 may be implemented in one or more computing devices coupled to network 110 configured to manage, supervise, and/or provide security services for client domains 106A-106N. In another example, wireless access tracker 302 may be distributed across a plurality of machines, nodes, or servers capable of monitoring accesses to client domains 106A-106N. Furthermore, where access requests may be logged prior to transmitting such requests to website access tracker 302 periodically or aperiodically, such logging may be distributed in a similar manner. For instance, one or more machines, nodes, or web servers may log access requests in a distributed manner. The logged access requests may either be compiled by one or more machines, nodes, or web servers prior to transmitting the logged requests to website access tracker, or website access tracker 302 may perform the compiling of such information.

Although it is shown in FIG. 1 that client domains 106A-106N may be hosted by or otherwise part of web servers 102A-102N, the techniques described herein are not so limited. In some examples, content of one or more client domains 106A-106N may be hosted at a client site or on a separate web server (not shown). In such an example, the hosting entity may provide access request 124 to website access tracker 302 in a similar manner as described above. For instance, the hosting entity (or any other entity) may implement one or more software components, a web firewall or antivirus service to act as an intermediary for such requests, or to provide such requests to website access tracker 302 periodically, aperiodically, or in real-time during or after receiving the access request. In this manner, website access tracker 302 may be enabled to collect website access information 304 across a wide range of unrelated websites irrespective of the hosting entity or other cloud service subscription, thereby increasing the degree of accuracy of the web robot classification discussed in greater detail below.

Returning now to the description of flowchart 200 of FIG. 2, in step 204, a particular access requestor is classified as a web robot, based at least in part on website access information 304. For instance, with continued reference to FIGS. 1 and 3, web robot detector 308 may obtain 314 website access information 304 from website access tracker 302. Based on website access information 304, web robot detector 308 may classify one or more access requestors as web robots and store the classification in robot classification 310. In an example embodiment, web robot detector 308 may utilize information corresponding to network activity for one or more client domains 106A-106N (e.g., website access information 304) to identify a particular one or more access requestors from which access requests originated in given time period. For instance, web robot detector 308 may determine whether a particular one or more access requestors have accessed a threshold number of websites on web servers 102A-102N during a time period. If the number of websites accessed during a time period exceeds a threshold, web robot detector 308 may classify the particular access requestor as a web robot.

In some examples, the time period for analyzing a compiled set of network activity information may include a rolling time period. For instance, web robot detector 308 may be configured to classify an access requestor as a web robot based on the most recent collection of website access information 304. In a non-limiting example, if a rolling time window of one hour is utilized, web robot detector 308 may be configured to analyze the most recent hour of website access information 304 in determining whether to classify a particular access requestor as a web robot. In other examples, the rolling time period may be larger (e.g., several hours, or days or weeks) or may be smaller (e.g., seconds or minutes). In yet another implementation, web robot detector 308 may utilize a weighted analysis in which website accesses by a particular requestor during the rolling time period are given more weight than website accesses occurring outside of the rolling time period. The techniques described herein are not limited to the aforementioned examples, but may also encompass any other analyses, including but not limited to statistical analyses of website access information 304 for a particular requestor to determine whether it should be classified as a web robot based on the requestor's network or cloud activity.

Web robot detector 308 may perform a classification of one or more access requestors as web robots at any time and/or at any regular or irregular interval. For instance, web robot detector 308 may analyze website access information 304 compiled over a given time period each time website access information 304 is obtained from website access tracker 302. In this manner, the classification of web robots may be updated in real-time, or in near real-time. In other examples, web robot detector 308 may update a classification periodically, for example every five minutes, thirty minutes, hourly, etc., as the classification of access requestors as web robots may continuously change with new robots being identified and older robots disappearing. It is noted, however, that the smaller the interval for performing a classification (or updating a classification), the quicker that web robot detector 308 may be enabled to classify a particular requestor as a web robot. On the other hand, a larger time interval for performing a classification (or updating a classification) means that web robot detector 308 may rely on a greater set of network activity for a particular requestor, leading to increased accuracy in classifying the requestor as a web robot. The time at which web robot detector 308 may perform or update the classification of web robots and/or the threshold number of websites may be predefined and/or may be configurable by a user (e.g., a systems administrator) through an interactive interface.

It is also noted that web robot detector 308 may classify a particular access requestor as a web robot based on a number and/or types of websites accessed for a given client domain. In one example, web robot detector 308 may be configured to analyze unrelated domains (e.g., root domains) accessed by a particular requestor during a given time period. In another example, web robot detector 308 may analyze network activity at a more granular level for a particular access requestor, such as by analyzing particular web resources within a website or client domain accessed by the requestor.

In the above manner, web robot detector 308 may be enabled to determine whether each access requestor identified in website access information 304 should be classified as a web robot based on the access requestor's network activity. For any particular access requestors classified as web robots, web robot detector 308 may store the classification in robot classification 310 in any suitable form or data structure, including but not limited to a listing of network identifiers of web robots in a database, a spreadsheet, a text file, etc. In one example, robot classification 310 may include a listing of IP addresses or user agent identifiers of one or more access requestors classified as web robots. In another example, robot classification 310 may contain a listing of all network identifiers identified during a given time period, with a flag or other indication identifying the particular access requestors classified as web robots.

In one implementation, web robot detector 308 may be implemented as a machine-learning-based model. For instance, web robot detector 308 may be trained based on one or more features extracted or generated from web access information 304. In an example, certain web robots, such as search engine web robots, may identify themselves as a robot through a user agent identifier (e.g., BingBot utilized by Microsoft®). Using a feature vector extracted from a known web robot, a machine-learning-based model of web robot detector 308 may learn which features are indicative of network activity corresponding to a web robot. Upon receiving access request 104, a feature vector corresponding to website access information 304 contained therein may be extracted and provided as an input to the machine-learning-based model of web robot detector 308. The machine-learning-based model may automatically determine, based on previously learned classifications, whether the extracted feature vectors should result in a particular access requestor being classified as a web robot.

In other example embodiments, robot classification 310 may also classify a particular web robot as either a malicious web robot or a benign web robot. For instance, based on a particular web robot's network activity for one or more client domains 106A-106N, web robot detector 308 may classify a particular access requestor as a malicious robot if the network activity corresponds to potentially malicious behavior. As an example, while benign web robots, such as search engine robots, typically follow a website owner's scanning restrictions by not indexing and/or scanning restricted web resources contained within a listing (e.g., a robots.txt or similar file placed in a website root directory), malicious robots do not typically follow such instructions. As a result, access requests 124 may be generated for such restricted resources for malicious web robots, while such requests are not generated for benign robots. Accordingly, web robot detector 308 may determine whether a particular robot is malicious or benign, and store such an indication in robot classification 310.

Robot classification 310 may comprise any suitable storage device, and may be distributed to or across one or more physical machines, virtual machines, nodes, or web servers 102A-102N. For example, if web robot detector 308 is configured to classify access requestors as web robots on a centralized system or service, web robot detector 308 may distribute the classification to one or more nodes or web servers 102A-102N upon performing or updating a classification. It is noted that web robot detector 308 is not limited to a centralized implementation, but rather may be implemented in any distributed fashion similar to website access tracker 302 described earlier.

In step 206, a request to permit access to a web resource by the particular access requestor is received. For instance, with continued reference to FIGS. 1 and 3, a particular access requestor classified as a web robot, for example one of web robots 114, may transmit access request 124 comprising a web resource access request 306 to permit access of the web resource by the requestor to access a web resource of one of client domains 106A-106N. Web resource enforcer 312 may obtain 318 web resource access request 306 from website access tracker 302. In examples, web resource access request 306 may contain web access information 304 as described above. For instance, web resource access request 306 may identify a particular access requestor (e.g., by its IP address), contain an identifier of a web resource to be accessed within a website, and an access time. While such information may be provided to web robot detector 308 as described earlier for performing and/or updating a classification of web robots, website access tracker may also provide such information as web resource access request 306 to web resource enforcer 312 to determine whether to restrict access to the requested resources by the access requestor.

In step 208, in response to receiving the request to permit access to a web resource by the particular access requestor, the particular access requestor may be prevented from accessing the web resource and/or a notification may be generated of an attempted access of the web resource. For instance, with reference to FIGS. 1 and 3, web resource enforcer 312 may determine that a network identifier of the particular access requestor of the web resource corresponds to a web robot obtained 316 from robot classification 310. Upon determining that the particular access requestor is a web robot, web resource enforcer 312 may perform one or more actions to restrict such access.

In one example, web resource enforcer may prevent the particular access requestor from accessing the web resource. For instance, where the particular access requestor requesting access to the web resource is classified as a web robot, web resource enforcer may discard or disregard web resource access request 306, thereby preventing web resource access request from being received by web servers 102A-102N. In another example, web resource enforcer may transmit an access denial message or indication to web servers 102A-102N indicating that the web servers should not provide access to the requested web resource. It is also noted, however, that in example embodiments where web resource enforcer 312 may block or prevent a particular access requestor classified as a web robot from accessing a web resource, robot enforcing system 122 may be implemented as an intermediary between an access requestor (e.g., one of computing devices 112 or web robots 114) and web servers 102A-102N, such that access requests 124 flow through robot enforcing system 122 and are monitored in real-time as access requests 124 are generated. In this manner, robot enforcing system 122 may act as a web firewall service capable of blocking one or more requestors (e.g., by IP address, MAC address, user agent identifier, etc.) from accessing certain content. The examples discussed herein are not intended to be limiting, and implementations may include other methods of actively and/or passively blocking or preventing a web robot from accessing a web resource.

In other examples, for instance where robot enforcing system 122 is not acting as an intermediary between an access requestor and web servers 102A-102N, web resource enforcer 312 may obtain web resource access request 306 at any time or interval. For instance, access request 124 comprising web resource access request 306 may be obtained from web servers 102A-102N in real-time or near real-time as web servers 102A-102N receive such requests from a requestor, or may be compiled into one or more logs and transmitted as a compilation at a later time (e.g., every few minutes, hours, etc.). In such an example, while web resource enforcer 312 may not be able to block or prevent such accesses, web resource enforcer 312 may still generate access notification 130 that provides an indication that a requestor classified as a robot has accessed a web resource. Access notification 130 may be provided, for instance, to a system or network administrator, owner, manager, or any other entity or entities involved in overseeing and/or managing security vulnerabilities of web servers 102A-102N or client domains 106A-106N. Generating access notification 130 may enable an overseeing and/or managing entity to take one or more protective measures to restrict future accesses by the requestor. For instance, a system or network administrator may block an IP address of the particular requestor classified as the web robot from accessing one or more resources, remove a web resource from accessibility online, provide further limitations or restrictions on sensitive web resources (e.g., by encrypting or password protecting), or enable other security measure to mitigate potential security vulnerabilities.

In one implementation, the requested web resource comprises a listing of restricted resources (e.g., a file identifying one or more URIs of a website, such as a file, folder, webpage, etc. that are not intended to be indexed by a search engine robot). For instance, the requested web resource may include a file of a website root directory, such as a robots.txt file. In other examples, the requested web resource includes one or more resources identified within the listing (e.g., resources identified in the file). In accordance with the techniques described herein, web resource enforcer 312 may be configured to obtain web resource information 126 comprising an identification of the file and/or resources contained within the file that are intended to be restricted from web robot accesses. Upon obtaining web resource access request 306 corresponding to an access request from a web robot for the file or a web resource identified in the file, web resource enforcer 312 may parse the information in web resource information 126 to determine that the requested web resources are restricted and accordingly prevent such access by the requestor and/or generate a notification of the attempted access.

Figure 4:
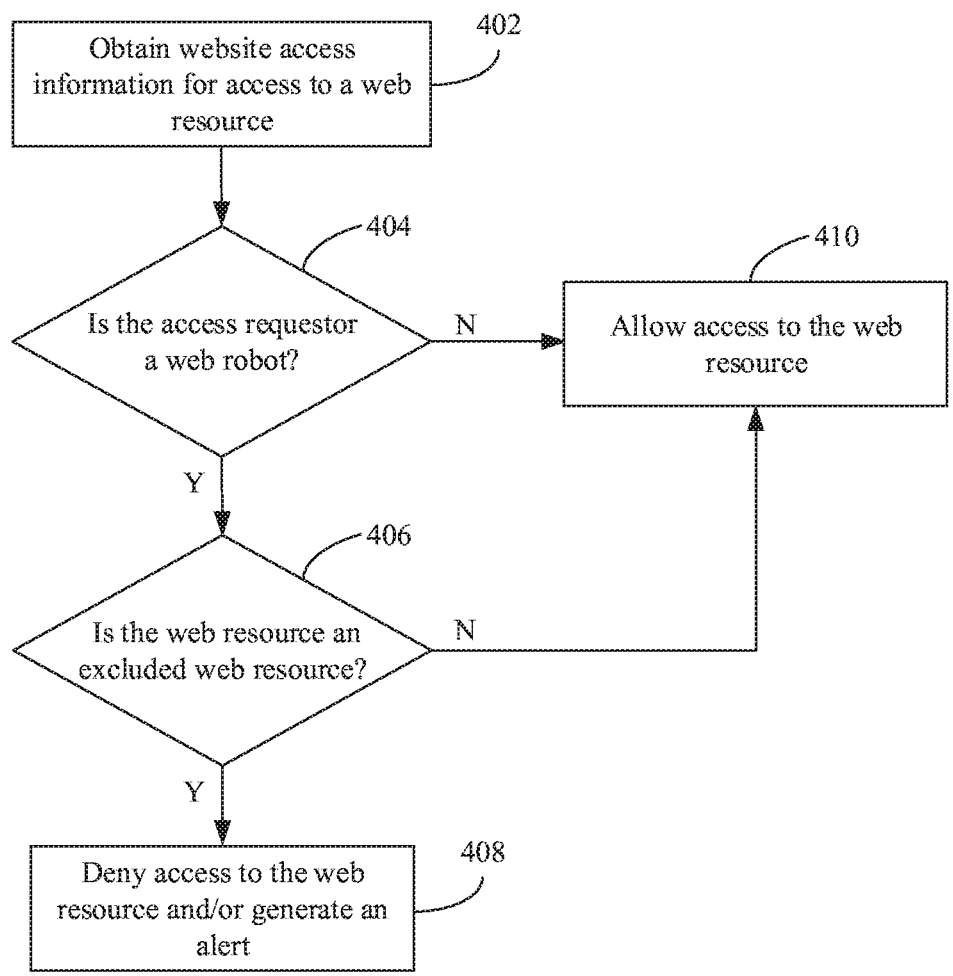
FIG. 4 shows a flowchart of a method for actively enforcing access restrictions to one or more web resources, according to an example embodiment.

As described above, in examples, robot enforcing system 122 may restrict access of a web robot by a requestor classified as a robot in various ways. For instance, FIG. 4 shows a flowchart 400 of a method for actively enforcing access restrictions to one or more web resources, according to an example embodiment. In an example, the method of flowchart 400 may be implemented by robot enforcing system 122, as shown in FIGS. 1 and 3. Other structural and operational implementations will be apparent to persons skilled in the relevant art(s) based on the following discussion regarding flowchart 400.

Flowchart 400 begins with step 402. In step 402, website access information 304 is obtained corresponding to a particular access requestor's request to access a web resource. For instance, website access tracker 302 may obtain access request 124 from a particular access requestor (e.g., one of computing devices 112 or web robots 114) in a similar manner as described above with reference to FIG. 3. Access request 124 may include a web resource access request 306, which may identify, among other things, a network identifier of a particular access requestor and an identity of a web resource within a website to be accessed.

In step 404, a determination is made whether the particular access requestor is classified as a web robot. With continued reference to FIGS. 1 and 3, web resource enforcer 312 may determine, based on robot classification 310 obtained from web robot detector 308, whether the particular access requestor has been identified as a web robot. Web robot enforcer 312 may make such a determination in a number of ways, including but not limited determining whether the network identifier (e.g., IP address) of the particular access requestor was classified as a web robot in robot classification 310. If the particular access requestor has been classified as a web robot, operation proceeds from step 404 to step 406. If the particular access requestor has not been classified as a web robot, operation proceeds from step 404 to step 410.

In step 406, if the particular access requestor has been classified as a web robot, a determination is made whether the requested web resource is an excluded web resource. For instance, with reference to FIG. 3, web robot enforcer 312 may reference web resource information 126 to identify one or more excluded web resources. In an example, web resource information 126 may identify a file (e.g., a robots.txt file) comprising a listing of excluded web resources, such as one or more URIs potentially containing private and/or sensitive content. In one example, an excluded web resource may be the file of the website root directory. In another example, an excluded web resource may comprise one or more of the resourced identified in the file of the website root directory.

In accordance with examples, web resource enforcer 312 may parse web resource information 126 to determine whether the requested web resource identified in web resource access request 306 corresponds to an excluded resource. For instance, if the requested web resource is a particular webpage in which sensitive and/or private content may be accessed (such as an administrator-only page of a website), web robot enforcer 312 parse web resource information 126, which may comprise a robots.txt file or the like, to determine whether the particular webpage is identified as an excluded web resource. If the requested web resource is an excluded web resource, operation proceeds from step 406 to step 408. If the requested web resource is not an excluded web resource, operation proceeds from step 406 to step 410.

In step 408, if the requested web resource is an excluded web resource, access to the requested web resource is denied and/or an alert is generated. For instance, step 408 may be performed in a similar manner as described above with reference to step 208 of FIG. 2. In one example, the access denial and/or alert generation may also be based in part on whether the particular access requestor has been identified as a malicious web robot or a benign web robot. For instance, if the particular access requestor is classified as a malicious web robot, web robot enforcer 312 may deny the requestor from accessing all of the excluded resources identified in web resource information 126. As one non-limiting example, if web resource information 126 includes a file (e.g., a robots.txt file) listing one or more excluded resources, web resource enforcer 312 may be configured to deny access to both the file as well as each excluded resource identified within the file. If the particular access requestor is instead classified as a benign web robot, such as a search engine robot, web resource enforcer 312 may be configured to allow the benign web robot to access the file comprising the listing of excluded resources, while denying access of the resources identified therein. As a result, a website owner may still enable a benign robot from indexing the website as provided by the instructions in a file of website root directory (and avoid indexing or scanning excluded resources), while preventing malicious robots from all such access. In other examples, however, web robot enforcer 312 may be configured to allow access to all requestors for the listing itself, while denying access for resources (e.g., URIs) identified therein. In this manner, excluded web resources containing potentially sensitive and/or private content may be blocked for all web robots, irrespective of whether the web robot is classified as malicious or benign.

Web resource enforcer 312 may also be configured to provide alerts in addition to, or as an alternative to, denying access to the excluded web resource. For instance, an alert may be generated in situations where web resource enforcer 312 is not enabled to block access requests, as described above. In other situations, an alert may be generated based on whether the web robot is a malicious web robot or a benign web robot. For instance, access requests to an excluded web resource may be denied for benign web robots without generation of a corresponding alert, while access requests to an excluded web resource by malicious web robots may result in both denying access and generation of an alert.

In step 410, if it is determined that the particular access requestor is not classified as a web robot or the requested web resource is not an excluded web resource, access to the web resource is allowed. For instance, with reference to FIG. 3, web robot enforcer 312 may allow access to the web resource if it is determined that the particular access requestor is not classified as a web robot in robot classification. In this manner, computing devices 112 are enabled to access the requested web resource without being hindered. Furthermore, if web robot enforcer 312 determines that particular access requestor is classified as a robot and is acting a webpage (e.g., a homepage that does not contain sensitive or private content) that is not identified as an excluded resource, web robot enforcer 312 may enable the robot to access the requested web resource.

As described above, in examples, web robot detector 308 may classify a particular access requestor as a web robot in various ways. For instance, FIG. 5 shows a flowchart 500 of a method for classifying an access requestor as a web robot based on a number of websites accessed, according to an example embodiment. In an example, the method of flowchart 500 may be implemented by web robot detector 308, as shown in FIG. 3. Other structural and operational implementations will be apparent to persons skilled in the relevant art(s) based on the following discussion regarding flowchart 500.

Flowchart 500 begins with step 502. In step 502, a determination is made that a number of websites accessed by a particular access requestor during a given time period exceeds a threshold. For instance, with reference to FIGS. 1 and 3, web robot detector 308 may classify a particular access requestor as a web robot if the number of websites accessed during a time period exceeds a threshold. In one example, one or more client domains 106A-106N may correspond to different domains and/or otherwise be unrelated to each other (e.g., belonging to different cloud service subscription accounts). Such a scenario may occur where web servers 102A-102N may provide hosting services for a number of different clients or companies, but implementations described herein are not limited to this illustrative example. Because web robot detector 308 may obtain website access information for a plurality of unrelated client domains 106A-106N, web robot detector 308 may determine that a threshold number of accesses of a number of websites in a period of time (e.g., in minutes, seconds, or hours) by a particular access requestor is unlikely to occur as a result of a human interaction, and thereby classify the particular access requestor as a web robot. Stated differently, since client domains 106A-106N may encompass domains or subscriptions that are company independent, an access requestor that accesses a plurality of the client domains in a given time period is likely to be a web robot for which access restrictions may be enabled.

In this manner, by detecting network activity across various client domains on a cloud services platform that is determined to be abnormal for a human actor, web robot detector 308 may quickly and accurately classify one or more access requestors as web robots. Furthermore, as the number of different client domains increases, the likelihood of a human access requestor (e.g., based on an identifier such as an IP address) accessing content from the different client domains decreases, thereby enabling web robot detector 308 to enhance the robot detection accuracy. As a non-limiting illustrative example, if a particular access requestor has accessed content of hundreds or thousands (or more) of unrelated websites or subscriptions in a given time period (e.g., in minutes or hours), web robot detector 308 may deduce that the particular access requestor is a web robot. The implementations are not, however, limited to this example and may include any other threshold value or time period that may be utilized by web robot detector 308 to automatically classifying a particular access requestor as a web robot.

As described above, web robot detector 308 may analyze network activity at a more granular level for a particular access requestor, such as by analyzing particular web resources within a website accessed by the requestor. For instance, FIG. 6 shows a flowchart 600 of a method for classifying an access requestor as a web robot by determining that the particular access requestor has accessed one or more restricted web resources, according to an example embodiment. In an example, the method of flowchart 600 may be implemented by web robot detector 308, as shown in FIG. 3. Other structural and operational implementations will be apparent to persons skilled in the relevant art(s) based on the following discussion regarding flowchart 600.

Flowchart 600 begins with step 602. In step 602, a determination is made that a particular access requestor has accessed one or more restricted web resources. For instance, with reference to FIG. 3, web robot detector 308 may classify a particular requestor as a web robot based, at least in part, on a determination that the requestor has accessed particular web resources within a website. In an example, website access information 304 obtained by web robot detector 308 may include an identifier of a web resource being accessed within a website. In such an example, web robot detector 308 may be configured to take into account individual web resources (e.g., webpages, files, folders, etc.), accessed by a particular access requestor in classifying the requestor as a web robot. In another example, web robot detector 308 may determine whether a particular access requestor has accessed a listing (e.g., a robots.txt file or similar listing) identifying restricted web resources (e.g., URIs) or accessed one or more of the restricted web resources identified therein. Since it is unlikely that a human actor would access such a listing, or access one or more restricted web resources identified therein, for a plurality of unrelated websites within a given time period, web robot detector 308 may thereby classify the particular access requestor as a web robot based on such accesses.

In another example embodiment, robot enforcing system 122 may be configured to prevent access of a web resource and/or generate a notification of an attempted access based on a confidence level. For instance, FIG. 7 shows a flowchart 700 of a method for generating a measure of confidence and generating a notification and/or preventing access to a web resource based on the measure of confidence, according to an example embodiment. In an example, the method of flowchart 700 may be implemented by web robot detector 308, as shown in FIG. 3. Other structural and operational implementations will be apparent to persons skilled in the relevant art(s) based on the following discussion regarding flowchart 700.

Flowchart 700 begins with step 702. In step 702, a measure of confidence that a particular access requestor is a web robot is determined. For instance, based on website access information 304 over one or more time periods, web robot detector 308 may generate a measure of confidence that a particular access requestor should be classified as a web robot. In one example, web robot detector 308 may analyze network activity over a plurality of different time periods. For instance, a shorter time period (e.g., a time period encompassing the last five minutes, ten minutes, thirty minutes, etc.) may be analyzed to determine whether a first threshold number of websites have been accessed by the particular access requestor, while a longer time period (e.g., a time period encompassing the last several hours or days) may be analyzed to determine whether a second threshold number of websites were accessed. While a shorter time period may enable web robot detector 308 to classify access requestors as web robots at quicker intervals, a longer time interval may enable a more accurate classification due to an increased sample size. It is noted that implementations are not limited to two time periods or two threshold values, but rather may encompass any number of time periods and/or threshold values for each time period. Based on the analysis for each time period and/or each threshold, web robot detector 308 may generate a measure of confidence that a particular access requestor is accurately classified as a web robot.

In another non-limiting example, web robot detector 308 may implement a plurality of different statistical analyses on a compilation of website access information 304 for one or more time periods. If, for instance, the different statistical analyses each indicate that a particular access requestor should be classified as a web robot, web robot detector 308 may generate a high measure of confidence that the requestor is a web robot. If, on the other hand, different statistical analyses result are inconclusive or inconsistent, web robot detector 308 may generate a low measure of confidence.

Upon classifying a particular access requestor and determining a measure of confidence for the requestor, web robot detector 308 may store a value or grade in robot classification 310 corresponding to the requestor. In example embodiments, web resource enforcer 312 may selectively generate access notification 130 and/or prevent the particular requestor from accessing a web resource based, at least in part, on the measure of confidence. For example, if a particular access requestor attempting to access a web resource has a measure of confidence associated with its classification as a web robot that is below a threshold, web resource enforcer 312 may determine to only generate access notification 130, rather than preventing access of the web resource. If, on the other hand, the particular access requestor has a high measure of confidence associated with its classification as a web robot that is not below a threshold, web resource enforcer 312 may prevent access of the requested web resource instead of generating access notification 130. In other examples, web resource enforcer 312 may both generate access notification 130 and prevent the particular requestor from accessing the web resource based on a high measure of confidence associated with the requestor.

Figure 8:
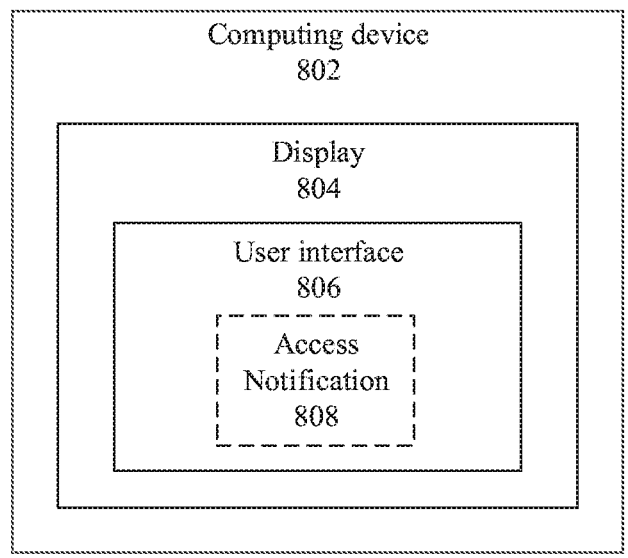
FIG. 8 shows an example user interface for displaying an access notification corresponding to an attempted access by a web robot, according to an example embodiment.

As described above, in an implementation, web resource enforcer 312 may generate alert notification 130 upon determining that a particular access requestor classified as a web robot has attempted to access a web resource. In an example, FIG. 8 shows an illustrative user interface for displaying an access notification corresponding to an attempted access by a web robot. For instance, FIG. 8 shows computing device 802, which may be included in or connected to any of web servers 102A-102N, computing device(s) 112, or another computing device used by a system or network administrator in charge of managing and/or overseeing the security of web servers 102A-102N or any of client domains 106A-106N. Computing device 802 may be any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone, a wearable computing device, or other type of mobile device, or a stationary computing device such as a desktop computer or PC (personal computer), or a server. In this example, computing device 802 may contain a display 804, which may comprise any suitable display, such as a liquid crystal display, cathode ray tube display, light-emitting diode display, or any other type of display connectable to computing device 802. Display 804 may be external to, or incorporated in computing device 802.

Display 804 may contain a user interface 806 that displays, among other things, an access notification 808 indicating that a particular access requestor classified as a web robot has attempted to access a web resource. In examples, access notification 808 is an example of access notification 130 described herein. Computing device 802 may also include other peripheral output devices (not shown) such as speakers and printers. In another implementation, an access notification may be transmitted to any such peripheral device as an alternative to, or in addition to being displayed on user interface 806. For example, an access notification may include any one or more of an audible notification, visual notification, haptic notification, or any type of notification.

User interface 806 is not limited to displaying access notification 808. In examples, user interface 806 may be configured to include an interactive interface enabling the configuration and/or modification of any of the techniques described herein. For example, user interface 806 may enable a user (e.g., a system or network administrator, a subscriber, etc.) to configure and/or modify if and/or when web resource enforcer 312 should generate an access notification and/or prevent a web robot from accessing a web resource. In another example, user interface 806 may enable one or more sensitivity adjustments, including but not limited to modifying a threshold value and/or a time period utilized by web robot detector 308 in classifying particular access requestors as web robots. In yet another example, user interface 806 may enable a user to configure web resource enforcer 312 to permit or deny a robot from access a listing of restricted resources (e.g., a robots.txt file), or one more resourced identified therein. User interface 806 may also enable a user to identify one or more additional resources outside of the restricted resource listing for which web resource enforcer 312 should block and/or generate an access notification. These examples are illustrative only, and user interface 806 may enable any other configuration or modification to any component, subcomponent, or routine described herein.

III. Example Computer System Implementation

One or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700 may be implemented in hardware, or hardware combined with software and/or firmware. For example, one or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700 may be implemented as computer program code/instructions configured to be executed in one or more processors and stored in a computer readable storage medium.

In another implementation, one or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700 may also be implemented in hardware that operates software as a service (SaaS) or platform as a service (PaaS). Alternatively, one or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700 may be implemented as hardware logic/electrical circuitry.

For instance, in an implementation, one or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700 may be implemented together in a system on a chip (SoC). The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 9:
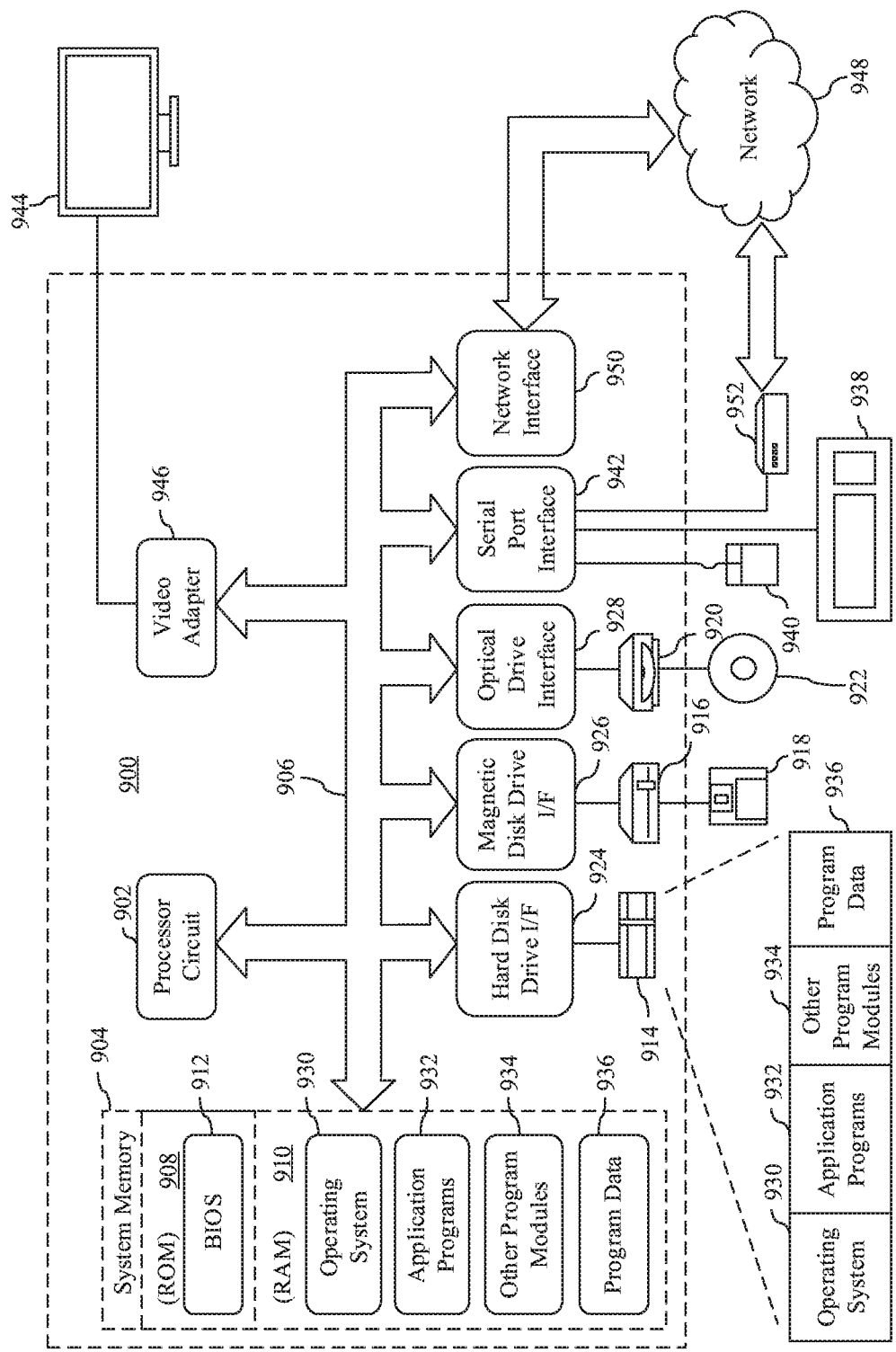
FIG. 9 is a block diagram of an example processor-based computer system that may be used to implement various example embodiments.

FIG. 9 depicts an implementation of a computing device 900 in which example embodiments may be implemented. For example, web servers 102A-102N, computing devices 112, web robots 114, or robot enforcing system 122 described above in reference to FIG. 1, website access tracker 302, web robot detector 308, and web resource enforcer 312 described above with reference to FIG. 3 may each be implemented in one or more computing devices similar to computing device 900 in stationary or mobile computer implementations, including one or more features of computing device 900 and/or alternative features. The description of computing device 900 provided herein is provided for purposes of illustration, and is not intended to be limiting. Example embodiments may be implemented in further types of computer systems, as would be known to persons skilled in the relevant art(s).

As shown in FIG. 9, computing device 900 includes one or more processors, referred to as processor circuit 902, a system memory 904, and a bus 906 that couples various system components including system memory 904 to processor circuit 902. Processor circuit 902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 902 may execute program code stored in a computer readable medium, such as program code of operating system 930, application programs 932, other programs 934, etc. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

Computing device 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 930, one or more application programs 932, other programs 934, and program data 936. Application programs 932 or other programs 934 may include, for example, computer program logic (e.g., computer program code or instructions) for implementing one or more of the components of web servers 102A-102N, computing devices 112, web robots 114, or robot enforcing system 122 described above in reference to FIG. 1, website access tracker 302, web robot detector 308, and web resource enforcer 312 described above with reference to FIG. 3, or computing device 802 described above with reference to FIG. 8, and one or more steps of flowcharts 200, 400, 500, 600, and 700, and/or further implementations described herein.

A user may enter commands and information into the computing device 900 through input devices such as keyboard 938 and pointing device 940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 902 through a serial port interface 942 that is coupled to bus 906, but may be connected by other interfaces, such as a parallel port, game port, or a universal serial bus (USB).

A display screen 944 is also connected to bus 906 via an interface, such as a video adapter 946. Display screen 944 may be external to, or incorporated in computing device 900. Display screen 944 may display information, as well as being a user interface for receiving user commands and/or other information (e.g., by touch, finger gestures, virtual keyboard, etc.). In addition to display screen 944, computing device 900 may include other peripheral output devices (not shown) such as speakers and printers. Display screen 944, and/or any other peripheral output devices (not shown) may be used for implementing user interface 806, and/or any further implementations described herein.

Computing device 900 is connected to a network 948 (e.g., the Internet) through an adaptor or network interface 950, a modem 952, or other means for establishing communications over the network. Modem 952, which may be internal or external, may be connected to bus 906 via serial port interface 942, as shown in FIG. 10, or may be connected to bus 906 using another interface type, including a parallel interface.

As used herein, the terms "computer program medium," "computer-readable medium," and "computer-readable storage medium" are used to refer to physical hardware media such as the hard disk associated with hard disk drive 914, removable magnetic disk 918, removable optical disk 922, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Implementations are also directed to such communication media that are separate and non-overlapping with implementations directed to computer-readable storage media.

As noted above, computer programs and modules (including application programs 932 and other programs 934) may be stored on the hard disk, magnetic disk, optical disk, ROM, RAM, or other hardware storage medium. Such computer programs may also be received via network interface 950, serial port interface 942, or any other interface type. Such computer programs, when executed or loaded by an application, enable computing device 900 to implement features of example embodiments discussed herein. Accordingly, such computer programs represent controllers of the computing device 900.

Implementations are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Example Embodiments

A system for restricting access to a web resource is described herein. The system includes: at least one processor circuit; at least one memory that stores program code configured to be executed by the at least one processor circuit, the program code comprising: a website access tracker configured to obtain website access information by monitoring accesses to a plurality of websites, the website access information including, for each access, a network identifier of an access requestor, an identifier of a website being accessed, and an access time associated with the access; a web robot detector configured to classify a particular access requestor as a web robot, based at least in part on the website access information; and a web resource enforcer configured to: receive a request to permit access to the web resource by the particular access requestor; and in response to receiving the request to permit access to the web resource by the particular access requestor, perform one or more of: prevent the particular access requestor from accessing the web resource; and generate a notification that the particular access requestor is attempting to access the web resource.

In one implementation of the foregoing system, the web robot detector is configured to classify the particular access requestor as a web robot, based at least in part on the website access information by determining that a number of websites accessed by the particular access requestor during a given time period exceeds a threshold.

In another implementation of the foregoing system, the web robot detector is configured to classify the particular access requestor as a web robot, based at least in part on the website access information by determining that a number of websites corresponding to different cloud service subscriber accounts accessed by the particular access requestor during a given time period exceeds a threshold.

In another implementation of the foregoing system, the plurality of websites comprises unrelated domains.

In another implementation of the foregoing system, the web resource is one of a file of a website root directory or a resource identified in the file of the website root directory.

In another implementation of the foregoing system, the file is a robots.txt file.

In another implementation of the foregoing system, the website access information includes, for each access, an identifier of a web resource being accessed within a website; and the web robot detector is configured to classify the particular access requestor as a web robot, based at least in part on the website access information by determining that the particular access requestor has accessed one or more restricted web resources within one or more websites.

In another implementation of the foregoing system, the web robot detector is further configured to generate a measure of confidence that the particular access requestor is a web robot; and the web resource enforcer is configured to generate the notification when the measure of confidence is below a threshold, and prevent the particular access requestor from accessing the web resource when the measure of confidence is not below the threshold.

A method of restricting access to a web resource is described herein. The method includes: obtaining website access information by monitoring accesses to a plurality of websites, the website access information including, for each access, a network identifier of an access requestor, an identifier of a website being accessed, and an access time associated with the access; classifying a particular access requestor as a web robot, based at least in part on the website access information; receiving a request to permit access to the web resource by the particular access requestor; and in response to receiving the request to permit access to the web resource by the particular access requestor, performing one or more of: preventing the particular access requestor from accessing the web resource; and generating a notification that the particular access requestor is attempting to access the web resource.

In one implementation of the foregoing method, the classifying the particular access requestor as the web robot, based at least in part on the website access information, comprises: determining that a number of websites accessed by the particular access requestor during a given time period exceeds a threshold.

In another implementation of the foregoing method, the classifying the particular access requestor as the web robot, based at least in part on the website access information, comprises: determining that a number of websites corresponding to different cloud service subscriber accounts accessed by the particular access requestor during a given time period exceeds a threshold.

In another implementation of the foregoing method, the plurality of websites comprises unrelated domains.

In another implementation of the foregoing method, the web resource is one of a file of a website root directory or a resource identified in the file of the website root directory.

In another implementation of the foregoing method, the classifying the particular access requestor as the web robot further comprises generating a measure of confidence that the particular access requestor is a web robot; and the generating the notification is performed when the measure of confidence is below a threshold, and the preventing the particular access requestor from accessing the web resource is performed when the measure of confidence is not below the threshold.

A computer program product is disclosed herein. The computer program product includes: a computer-readable memory having computer program logic recorded thereon that when executed by at least one processor causes the at least one processor to perform a method comprising: obtaining website access information by monitoring accesses to a plurality of websites, the website access information including, for each access, a network identifier of an access requestor, an identifier of a website being accessed, and an access time associated with the access; classifying a particular access requestor as a web robot, based at least in part on the website access information; receiving a request to permit access to the web resource by the particular access requestor; and in response to receiving the request to permit access to the web resource by the particular access requestor, performing one or more of: preventing the particular access requestor from accessing the web resource; and generating a notification that the particular access requestor is attempting to access the web resource.

In one implementation of the foregoing computer program product, the classifying the particular access requestor as the web robot, based at least in part on the website access information, comprises: determining that a number of websites accessed by the particular access requestor during a given time period exceeds a threshold.

In another implementation of the foregoing computer program product, the classifying the particular access requestor as the web robot, based at least in part on the website access information, comprises: determining that a number of websites corresponding to different cloud service subscriber accounts accessed by the particular access requestor during a given time period exceeds a threshold In another implementation of the foregoing computer program product, the plurality of websites comprises unrelated domains.

In another implementation of the foregoing computer program product, the web resource is one of a file of a website root directory or a resource identified in the file of the website root directory.

In another implementation of the foregoing computer program product, the classifying the particular access requestor as the web robot further comprises generating a measure of confidence that the particular access requestor is a web robot; and the generating the notification is performed when the measure of confidence is below a threshold, and the preventing the particular access requestor from accessing the web resource is performed when the measure of confidence is not below the threshold.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the present invention should not be limited by any of the above-described example embodiments, but should be defined only in accordance with the following claims and their equivalents.

What is claimed is:

1. A system for restricting access to a web resource hosted on a server, the system comprising:
   at least one processor circuit;
   at least one memory that stores program code configured to be executed by the at least one processor circuit, the program code comprising:
      a website access tracker configured to obtain website access information by monitoring accesses to a plurality of websites, the website access information including, for each access, a network identifier of an access requestor, an identifier of a website being accessed, and an access time associated with the access;
      a web robot detector configured to classify a particular access requestor as a web robot, based at least in part on the website access information; and
      a robot enforcing system configured to:
         parse a file in a root directory of a website to identify a listing of restricted resources based on one or more disallow statements contained therein, the one or more disallow statements indicating that the restricted resources are not to be indexed by a search engine robot;

receive a request to permit access to the web resource by the particular access requestor; and prevent the particular access requestor from accessing the web resource hosted on the server based at least on a determination that the web resource is contained in the listing of restricted resources identified from the parsed file and the classification of the particular access requestor as a web robot.

2. The system of claim 1, wherein the web robot detector is configured to classify the particular access requestor as a web robot, based at least in part on the website access information by:

determining that a number of websites accessed by the particular access requestor during a given time period exceeds a threshold.

3. The system of claim 1, wherein the web robot detector is configured to classify the particular access requestor as a web robot, based at least in part on the website access information by:

determining that a number of websites corresponding to different cloud service subscriber accounts accessed by the particular access requestor during a given time period exceeds a threshold.

4. The system of claim 1, wherein the plurality of websites comprises unrelated domains.

5. The system of claim 1, wherein the file is a robots.txt file.

6. The system of claim 1, wherein the website access information includes, for each access, an identifier of a web resource being accessed within a website; and wherein the web robot detector is configured to classify the particular access requestor as a web robot, based at least in part on the website access information by determining that the particular access requestor has accessed one or more restricted web resources within one or more websites.

7. The system of claim 1, wherein the web robot detector is further configured to generate a measure of confidence that the particular access requestor is a web robot; and wherein the robot enforcing system is configured to prevent the particular access requestor from accessing the web resource when the measure of confidence is not below a threshold.

8. A method of restricting access to a web resource hosted on a server, the method comprising:

obtaining website access information by monitoring accesses to a plurality of websites, the website access information including, for each access, a network identifier of an access requestor, an identifier of a website being accessed, and an access time associated with the access;

classifying a particular access requestor as a web robot, based at least in part on the website access information;

parsing a file in a root directory of a website to identify a listing of restricted resources based on one or more disallow statements contained therein, the one or more disallow statements indicating that the restricted resources are not to be indexed by a search engine robot;

receiving a request to permit access to the web resource by the particular access requestor; and preventing the particular access requestor from accessing the web resource hosted on the server based at least on a determination that the web resource is contained in the listing of restricted resources identified from the parsed file and the classification of the particular access requestor as a web robot.

9. The method of claim 8, wherein the classifying the particular access requestor as the web robot, based at least in part on the website access information, comprises:

determining that a number of websites accessed by the particular access requestor during a given time period exceeds a threshold.

10. The method of claim 8, wherein the classifying the particular access requestor as the web robot, based at least in part on the website access information, comprises:

determining that a number of websites corresponding to different cloud service subscriber accounts accessed by the particular access requestor during a given time period exceeds a threshold.

11. The method of claim 8, wherein the plurality of websites comprises unrelated domains.

12. The method of claim 8, wherein the classifying the particular access requestor as the web robot further comprises generating a measure of confidence that the particular access requestor is a web robot; and wherein the preventing the particular access requestor from accessing the web resource is performed when the measure of confidence is not below a threshold.

13. The method of claim 8, wherein the file is a robots.txt file.

14. The method of claim 8, wherein the website access information includes, for each access, an identifier of a web resource being accessed within a website; and wherein the classifying the particular access requestor as a web robot comprises classifying the particular access requestor as a web robot by determining that the particular access requestor has accessed one or more restricted web resources within one or more websites.

15. A computer program product comprising a computer-readable memory having computer program logic recorded thereon that when executed by at least one processor causes the at least one processor to perform a method of restricting access to a web resource comprising:

obtaining website access information by monitoring accesses to a plurality of websites, the website access information including, for each access, a network identifier of an access requestor, an identifier of a website being accessed, and an access time associated with the access;

classifying a particular access requestor as a web robot, based at least in part on the website access information;

parsing a file in a root directory of a website to identify a listing of restricted resources based on one or more disallow statements contained therein, the one or more disallow statements indicating that the restricted resources are not to be indexed by a search engine robot;

receiving a request to permit access to the web resource by the particular access requestor;

prevent the particular access requestor from accessing the web resource hosted on the server based at least on a determination that the web resource is contained in the listing of restricted resources identified from the parsed file and the classification of the particular access requestor as a web robot.

16. The computer program product of claim 15, wherein the classifying the particular access requestor as the web robot, based at least in part on the website access information, comprises:

determining that a number of websites accessed by the particular access requestor during a given time period exceeds a threshold.

17. The computer program product of claim 15, wherein the classifying the particular access requestor as the web robot, based at least in part on the website access information, comprises:
determining that a number of websites corresponding to different cloud service subscriber accounts accessed by the particular access requestor during a given time period exceeds a threshold.

18. The computer program product of claim 15, wherein the plurality of websites comprises unrelated domains.

19. The computer program product of claim 15, wherein the classifying the particular access requestor as the web robot further comprises generating a measure of confidence that the particular access requestor is a web robot; and
wherein the preventing the particular access requestor from accessing the web resource is performed when the measure of confidence is not below a threshold.

20. The computer program product of claim 15, wherein the file is a robots.txt file.

\* \* \* \* \*